United States Patent [19]

Osborne, Sr.

[11] 4,063,706
[45] Dec. 20, 1977

[54] PINCH VALVE FORMED FROM A WIRE HELIX

[76] Inventor: Calvin E. Osborne, Sr., P.O. Box 606, Borger, Tex. 79007

[21] Appl. No.: 727,993

[22] Filed: Sept. 30, 1976

[51] Int. Cl.$^2$ .............................................. F16K 7/04
[52] U.S. Cl. ..................................... 251/4; 24/131 R; 29/157.1 R; 29/451
[58] Field of Search ............ 251/4; 24/131 R, 131 C; 29/157.1, 451

[56] References Cited
U.S. PATENT DOCUMENTS

| | | | |
|---|---|---|---|
| 2,642,025 | 6/1953 | Swonger | 114/210 |
| 2,663,114 | 12/1953 | Warner | 24/131 R X |
| 3,374,509 | 3/1968 | Logan et al. | 251/4 X |

Primary Examiner—Martin P. Schwadron
Assistant Examiner—Richard Gerard
Attorney, Agent, or Firm—George H. Mitchell, Jr.

[57] ABSTRACT

A wire helix having adjacent turns normally spaced so that the wall of a flexible tubing will be pinched closed when placed between them has at least one pair of turns spaced far enough apart to allow the tubing to pass between them without being pinched; valving action takes place when the tubing is twisted around the helix to move it between the unobstructed position to the pinched position. In a modified form, there are two locations in the helix where the tubing may pass outwardly and then reenter the helix without being obstructed; in this form, the looped portion of the tubing lying outside the helix may be rotated about the helix in either direction to pinch it closed.

17 Claims, 6 Drawing Figures

PINCH VALVE FORMED FROM A WIRE HELIX

This invention relates to valves, and more particularly to the type of valve in which control of the flow of fluid through a flexible tubing is accomplished by compressing, or pinching, the opposite sides of the wall of the tubing to close the interior passage.

One object of the invention is to make a so-called, "pinch" valve having the utmost simplicity of construction.

Another object of the invention is to make a valve of this type by utilizing a commercially produced resilient wire helix.

A further object of the invention is to make a valve of this type in which a flexible tubing is engaged with a resilient wire helix having a variable spacing between some of the turns, whereby the tubing can be twisted around the helix between a closed and open position, depending upon whether the tubing is engaged by closely spaced, or widely spaced, turns of the helix.

Still another object is to provide a valve of this type wherein the helix may be formed in three sections separated from each other by widely spaced turns through which the tubing passes for uninterrupted flow, so that closing of the tubing wall can be accomplished by twisting the exterior loop of the tubing about the center helix in either direction.

Other objects and advantages will be apparent to those skilled in the art after reading the following specification in connection with the attached, drawings in which:

FIG. 1 is a side elevation of a preferred form of pinch valve made in accordance with this invention, shown in position on a length of flexible tubing to allow fluid to flow through;

Figure 1:
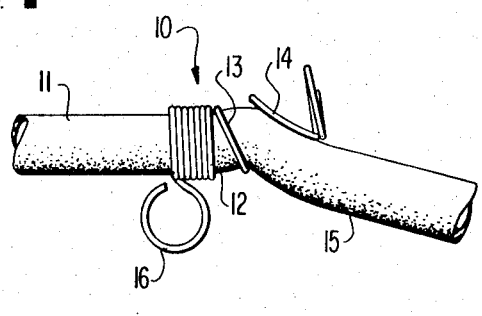
Figure 2:
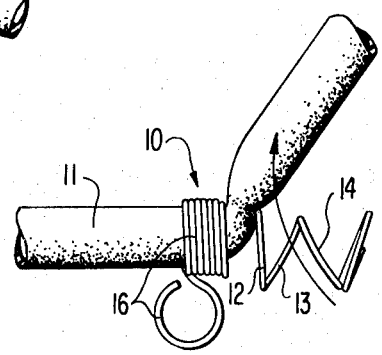
FIG. 2 is similar to FIG. 1 except that the tubing has been rotated in the direction of the arrow to the closed position.

In FIGS. 1 and 2 of the drawings, there is shown one form of pinch valve mechanism, indicated generally by numeral 10, associated with a length of flexible tubing 11, made of rubber or similar elastomeric material. The valving element 10 comprises a resilient wire helix having a number of closely spaced turns 12 of a diameter sufficient for the tubing 11 to be freely received axially therein, with at least two turns 13 and 14 of the helix being widely spaced from each other by a distance sufficient so that the opposite sides of the wall of the end 15 of the tubing, when brought out from the interior of the helix 12 between the wire turns 13 and 14, will not be compressed, or pinched, to close off the flow of fluid through the tubing. A stop means 16 can be formed at the other extremity of the helix by twisting the end turn of wire upwardly at an angle with respect to the remainder of the helix.

In operation, fluid would normally flow from left to right, as shown in FIGS. 1 and 2, so that it enters the tubing 11 and discharges with substantially unrestricted flow from the other end 15, as shown in FIG. 1. When it is desired to stop the flow, it is only necessary to grasp the stop means 16 with the fingers of one hand and twist the tubing end 15 in a clockwise direction as viewed from the right of the drawings as indicated in FIG. 2. This brings the tubing into a position where it emerges from the helix between a pair of closely spaced wires 12, as seen in FIG. 2. The spacing of these wires is such that the opposite sides of the wall of the tubing are compressed, or pinched, to the extent that the flow of fluid is cut off. To restore the flow, the end 15 is twisted in the reverse direction to return the tubing to its unrestricted position between turns 13 and 14.

Various types of synthetic elastomeric materials, such as synthetic rubber, may be used for the tubing, depending upon the fluid with which it is to be used. It is also helpful to apply a film of silicone grease to the surface of the tubing to facilitate relative movement of the tubing into and out of engagement with the closely spaced wires. Also, while the wires 12 are shown in the drawings as being formed into a helix of uniform diameter with adjacent turns in abutting relationship to each other, it is only essential that the space between adjacent turns be such that when the tubing has been positioned between a pair of turns, the opposite sides of the tubing wall will be compressed together. Thus, the spacing of the wires will depend on the thickness and relative resilience of the tubing walls and the diameter and resilience of the wire used in making the helix. In addition, while the diameter of all of the turns of the helix are uniform, it will be understood that the diameter of the turns may vary so as to provide varying amounts of spacing between adjacent turns.

One method of manufacturing the device 10 comprises the steps of taking a previously formed resilient wire helix having closely spaced turns of uniform diameter, and exerting axial force on one or more of the end turns 13 and 14 to pull them beyond the elastic limit of the metal a sufficient distance so that when the force is released and the turns of wire spring back, the space between them will then be sufficient to allow the tubing 15 to pass between them without any substantial distortion.

Figure 3:
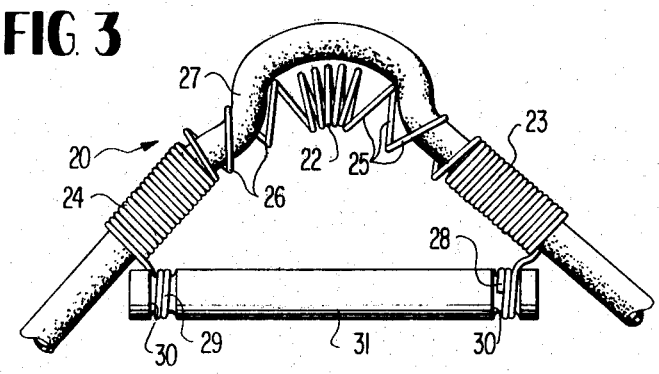
FIG. 3 illustrates a modified form of pinch valve shown in an open position.
Figure 4:
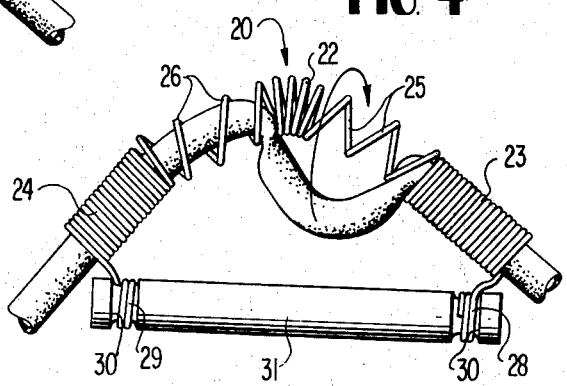
FIG. 4 shows the tubing rotated to one of the two closed positions.
Figure 5:
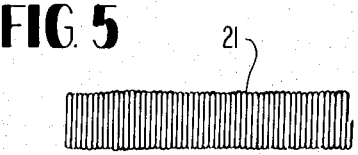
FIG. 5 illustrates a resilient wire helix from which the valving elements shown in FIGS. 1–4 can be made.

The modified form of a valving device, indicated generally by numeral 20 in FIGS. 3 and 4, can be formed from a somewhat longer length of commercially produced helically wound resilient wire 21, as shown in FIG. 5. In this form of the invention, the central portion 22 may be gripped in a fixed holder (not shown) and the respective right and left sections 23 and 24 of the helix may be engaged by the jaws of a pair of moveable holders (not shown) whereby force can be exerted in tension in an axial direction so as to pull the sections 23 and 24 outwardly from the fixed section 22 a distance sufficient to stretch the intervening turns of wire 25 and 26 beyond the elastic limit of the metal a distance such that when the sections 23 and 24 are released from the holders, the wires 25 and 26 will not return to their closely spaced relationship of the original helix, but will have been deformed an amount such that the space between adjacent turns will allow a flexible tubing 27 to pass between them without being compressed. At the respective extremities of the helix sections 23 and 24, one or more turns of wire 28 and 29 may be bent backwardly and a rigid handle 31 having grooves 30 at each end can be attached to the helix by forcing the turns of wire 28 and 29 into the respective groove 30.

Figure 6:
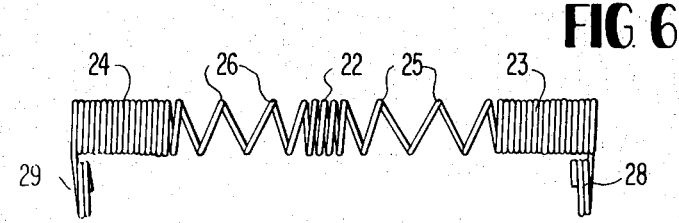
FIG. 6 shows the wire helix of FIGS. 3 and 4 before attachment to the tubing.

When the helix shown in FIG. 6 has been completed, one end of the tubing 27 is inserted from one end of the assembly, for example, from the left until it reaches the widely spaced turns 26, at which point the tubing is pulled out between these turns of wire; the tubing is then advanced further until it can be reinserted between the other set of widely spaced turns 25 back into and through the helix 23. In operation, the fluid flow through the tubing 27 is unimpeded when in the "centered" position shown in FIG. 3. In order to stop the flow, the short section of tubing lying outside of the center helix section 22 can be rotated bodily around the exterior of this helix section in either direction to pinch off the flow. For example, if the tubing is rotated in a clockwise direction, as viewed from the right in the drawing, and as indicated by the arrow in FIG. 4, the tubing is longitudinally shifted to the right until it begins to enter the closely wound turns of both the helices 22 and 23, as shown in FIG. 4. Obviously, the flow can be restored by turning the short section of tubing in the reverse direction to return it to the position of FIG. 3. In the alternative, further twisting of the tubing in the counterclockwise direction will result in the tubing becoming compressed between the turns of helices 22 and 24 where the wall of the tubing will again be compressed.

Having described two forms of the invention, it will be apparent that various changes and modifications may be made in the invention which would come within the scope of the annexed claims at the end of the specification.

What is claimed is:

1. In a valve of the type which includes a length of flexible tubing, the opposite sides of the wall of the tubing being pinched together to control the flow of fluid therethrough, the improvement which comprises a resilient wire helix having spacing between adjacent turns which is variable between a first pair of adjacent turns and a second pair of adjacent turns such that the opposite walls of said tubing, when engaged between said first pair of turns, will be pinched to stop the flow of fluid, and, when engaged between said second pair of turns, will be substantially undistorted to allow substantially free flow of fluid, and means to mount said wire helix on said tubing for movement between said first and second pair of turns.

2. The invention defined in claim 1, wherein said first pair of adjacent turns are connected with a plurality of helically wound, closely spaced turns of wire of uniform diameter.

3. The invention defined in claim 2, wherein said second pair of adjacent turns are connected with a plurality of helically wound, widely spaced turns of wire.

4. The invention defined in claim 1, wherein said means to mount said helix comprises a plurality of turns of wire of said helix having an inside diameter sufficient to freely, slideably and rotatably received said tubing therein.

5. The invention defined in claim 1, wherein said means to mount said helix also includes stop means projecting from said helix to hold said helix when said tubing is moved between said first and second pair of turns.

6. The invention defined in claim 5, wherein said helix includes a plurality of turns of uniform diameter and said stop means comprising at least one turn of said helix disposed to project outwardly of the helix.

7. The invention defined in claim 1, wherein said helix includes two sections of helically wound turns of wire having inside diameter sufficient to freely receive said tubing therein, said two sections being joined to each other by a plurality of other turns of said helix which are disposed entirely exteriorly of said tubing.

8. The invention defined in claim 7, wherein at least some of said other turns of wire are closely spaced and are joined with each of said respective first two sections by at least one widely spaced turn of wire.

9. The invention defined in claim 7, wherein said two sections of helically wound turns of wire are also connected by a rigid handle.

10. The invention defined in claim 9, wherein said two sections of helically wound turns of wire are disposed at an angle with respect to each other and said handle is a straight element connected with the extremities of said two sections.

11. Method of forming a valve of the type which includes a flexible tubing and a pinch-valving element for use with the tubing for compressing the opposite sides of the wall thereof to stop the flow of fluid, comprising the steps of:
   a. applying axially directed force in tension to a pair of adjacent turns of a resilient multi-turn wire helix the normal spacing between adjacent turns of said helix being such that said tubing will be pinched closed when positioned therebetween, said axially directed force being sufficient to deform said adjacent turns beyond the elastic limit of said wire such that when said tension is released the distance between said pair of turns will be sufficient to permit said tubing to pass therebetween without being pinched to any substantial degree;
   b. releasing said tension;
   c. bending at least one turn of wire of said helix angularly with respect to the rest of the helix to form a stop means.

12. The method defined in claim 11, wherein the diameter of said helix is uniform along the length thereof and adjacent turns are normally in abutting relationship to each other.

13. The method defined in claim 11, which includes the additional steps of:
   d. inserting said tubing axially into said undeformed helix, and;
   e. leading one end of the tubing from the interior of the tubing to the exterior thereof through the space between said pair of turns.

14. The method of claim 11, which includes the additional steps of:
   d. inserting said tubing coaxially into said undeformed helix, and;
   e. leading one end of the tubing out of the helix between said pair of deformed turns.

15. The method of claim 11, which includes the additional steps of:
   d. applying said axially directed force in tension to a pair of adjacent turns located medially of the length of said helix;
   e. applying said axially directed force in tension to deform another pair of adjacent turns located medially of the length of said helix and spaced from said first mentioned pair of turns, and;
   f. releasing said force in tension against both of said pairs of adjacent turns.

16. The method of claim 14, which includes the additional steps of:
   g. bending another turn of wire angularly with respect to the rest of the helix to form stop means at both extremities of the helix, and;

h. connecting a rigid handle between said two stop means.

17. The method of claim 15, which includes the additional steps of:

i. inserting one end of a length of said tubing coaxially into one extremity of said helix and advancing said one end to one pair of said deformed adjacent turns;

j. further advancing said tubing and withdrawing said one end from the helix through the space between said deformed pair of turns;

k. further advancing said tubing and reinserting said one end into the interior of the helix through the space between said another pair of deformed turns of wire, and;

l. further advancing said tubing and withdrawing said one end outwardly from the other extremity of the helix.

* * * * *